Jan. 28, 1941.   G. W. BLAIR ET AL   2,230,128
METHOD OF MAKING CONTOURED FLOOR COVERINGS
Filed March 2, 1936    2 Sheets-Sheet 1
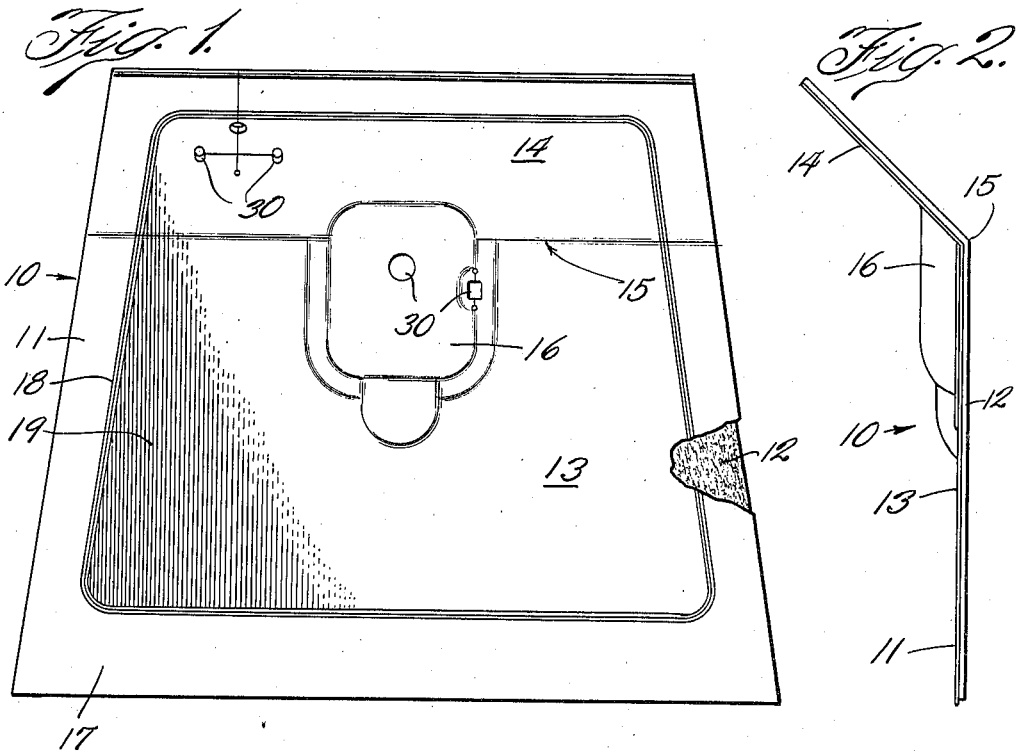
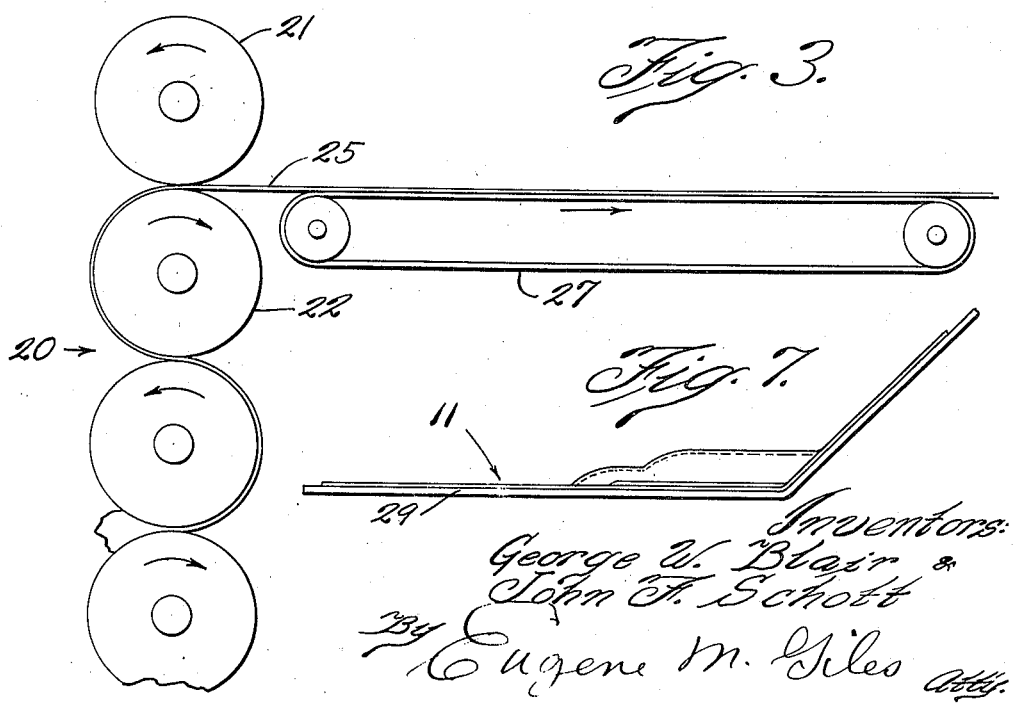

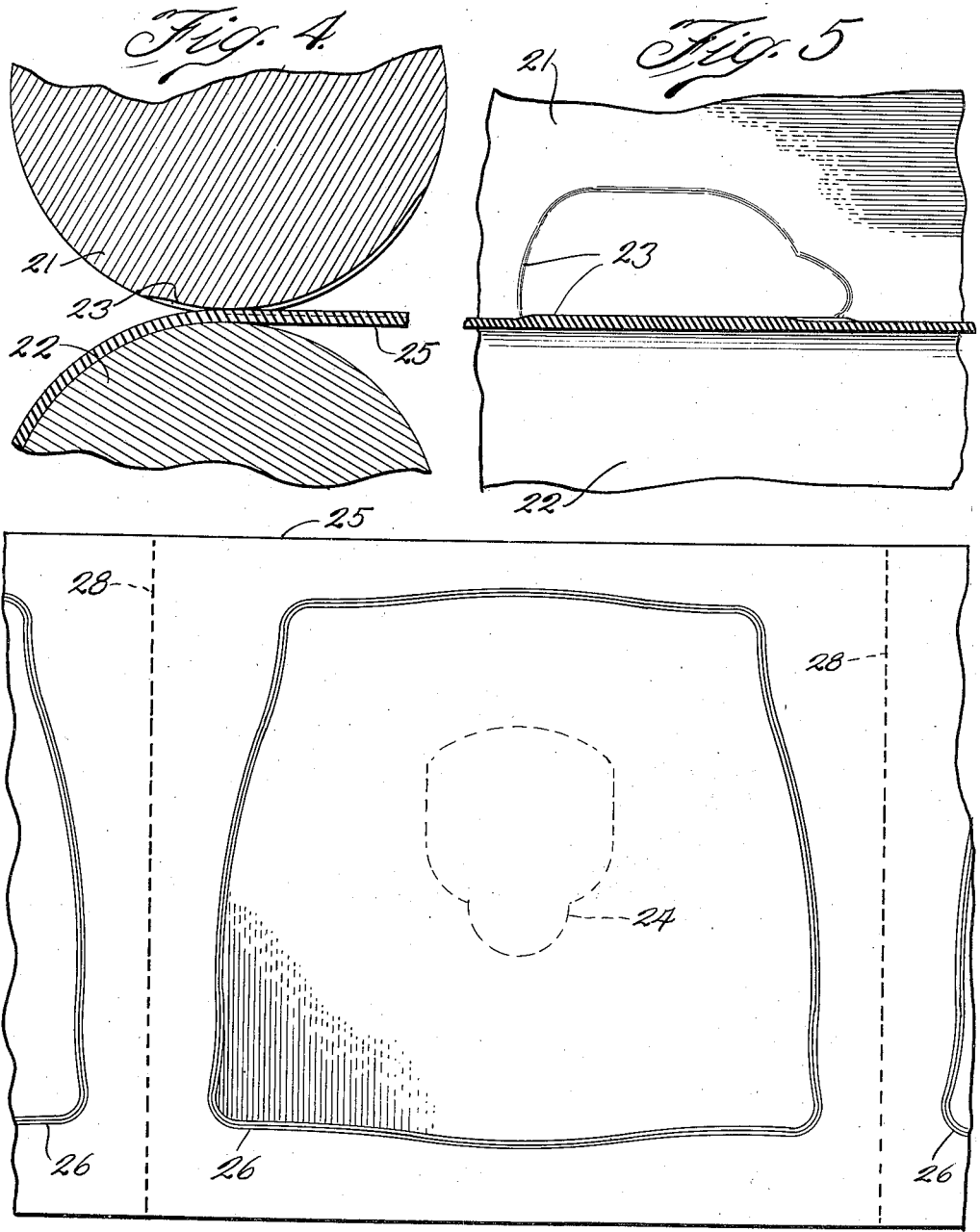

Patented Jan. 28, 1941

2,230,128

UNITED STATES PATENT OFFICE 2,230,128

METHOD OF MAKING CONTOURED FLOOR COVERINGS

George W. Blair and John F. Schott, Mishawaka, Ind., assignors to Mishawaka Rubber and Woolen Manufacturing Company, Mishawaka, Ind., a corporation of Indiana Application March 2, 1936, Serial No. 66,659

13 Claims. (Cl. 18—56)

Our invention relates to mats or floor coverings such as shown in our co-pending application Serial No. 696,136, on which Patent No. 2,032,-832 was granted March 3, 1936, wherein a layer of rubber or the like, with pattern impressed thereon, is stretched and distorted or deformed to provide a hump or other elevational configurations which may be necessary to properly fit the contour of the floor, the present invention having reference more particularly to methods of making the rubber layers of or for such mats or floor coverings.

In mats or floor coverings of the character to which this invention relates, it is desirable to provide the exposed surface with an ornamental pattern or design and it is preferable to impress the pattern or design on the rubber or other material before forming same with the hump or other elevational configurations, as for example by calendering the design on the rubber. Moreover, it is also desirable at those places where the rubber is stretched to form the hump or other elevational configurations, to form the blank with extra thickness so as to provide sufficient stock so that when stretched out to the increased area required for the hump or other elevational contour, the resulting thickness of the rubber will be adequate and substantially the same as that of the unstretched areas.

However, the impressing of the pattern or design on the rubber sheet before contouring or forming with the hump or other elevational configurations, while a very economical and desirable procedure since it permits convenient and high speed production, presents serious difficulties owing to various conditions and operations which distort the pattern or design in such a manner and to such an extent that, except in the case of all over mottling or some similar designs which have no border or regularity of pattern, the resultant product is highly unsatisfactory and unacceptable. The rubber shrinks as it cools after calendering and shrinks lengthwise of the sheet more than transversely. Moreover, in taking the rubber sheet off the pattern roll it sticks to the roll at some places more than at others according to variations of the pattern or engraving on the roll, and this results in a local stretching and distortion with resultant irregular, loose and baggy areas as the rubber comes off of the design impressing roll. Furthermore, as the rubber is stretched to form the hump or other elevational contour the pattern at these places is not only distorted but there is at the same time a pulling in of the edges of the sheet which varies along the edge according to the shape and elevation of the hump and the nearness thereof to the edge, all of which affects the pattern on the finished article and is particularly noticeable and undesirable where the mats are provided with a border which is the present prevailing practice.

The principal objects of our invention are to provide satisfactory contoured mats with a pattern or design, including a border, if desired, on the surface thereof; to permit the impressing of the pattern or design thereon before contouring; to avoid undesirable distortion of the pattern or design in the finished article; to insure adequate stock at the areas that are distended or stretched; and in general to simplify and facilitate the making of contoured mats with undistorted patterns or designs and permit high speed production thereof, these and other objects being accomplished as will be apparent from the following description wherein reference is made to the accompanying drawings, in which Fig. 1 is a top or plan view of a mat made in accordance with our invention;

Fig. 2 is a lateral edge view thereof;

Fig. 3 is a view somewhat diagrammatical of the calender which produces the sheet rubber for the mats and the conveyor for removing the sheet rubber therefrom;

Fig. 4 is a fragmentary sectional view of the two rolls which cooperate to impress the pattern on the rubber sheet;

Fig. 5 is a fragmentary view looking at the front of said rolls of Fig. 4;

Fig. 6 is a fragmentary portion of the sheet of rubber with pattern or design thereon as produced by the calender;

Fig. 7 is a side edge view of the form on which the rubber blank is shaped in the contoured mat form.

Referring to the accompanying drawings, the reference numeral 10 indicates a floor covering of the character to which the invention relates, the floor covering being shown in the form of a mat such as employed in automobiles and having a tread layer 11 of rubber or other material which is capable of being shaped in the manner hereinafter explained to correspond to elevational characteristics of the floor on which it is to be used, and such layer being shown as provided on the under side, in accordance with the usual practice, with a relatively thick layer 12 of felt or other cushioning and insulating material, with which however, the present invention is not concerned. The particular mat illustrated is designed for the operator's compartment of the automobile and has the main floor portion 13 and the toe board portion 14, which latter is bent up along the line 15 at an inclination to the main floor portion 13 and this mat is formed or contoured to provide an internal elevated portion or hump 16 of suitable shape and size to correspond to and receive therein the transmission housing which projects upwardly through and above the floor of the car. The mat also has the usual openings 30 therethrough for pedals, operating levers, controls and the like, which may be required for the particular car in which the mat is to be used, and it is to be understood that the hump 16 may be of any size or shape and located wherever required according to the requirements of the particular car or make of car for which the mat is made.

Such mats are usually provided with a pattern or design on the exposed upper surface, the mat herein for purposes of illustration being represented as having a plain margin 17 at the outer side of a border 18, the entire area within which is lined as indicated at 19, it being understood, of course, that any other border arrangement and pattern markings may be employed as desired. Obviously it is very important that in the finished mat the pattern should not be noticeably distorted and especially that the border 18 and the lines 19 (at least in the flat portions of the mat) should be straight or in accordance with the pattern as originally designed, or in other words, that the integrity of the intended design should be maintained without distortion so that the finished mat has a satisfactory and acceptable appearance.

To insure this and at the same time have the benefit of the convenience, high speed production and simple equipment that are made possible by impressing the design on the rubber before it is shaped or contoured in the mat form, we calendar on the rubber the selected design or pattern in a modified or distorted form so as to compensate for the various distorting factors to which the rubber is thereafter subjected, so that after the rubber leaves the calendar and is shaped in the form required for the particular mat the distortion thereof which occurs after the impression of the design thereon corrects the inaccuracies of the impressed design and produces a perfect, undistorted design on the finished mat. Since the portion of the blank which forms the hump 16 is stretched to produce the hump shape, it will be understood that the design on this portion is under-distorted, or in other words is crowded into a smaller surface area than it will occupy when stretched into the hump form.

In our preferred procedure the rubber is formed in a long sheet in the calendar, which is indicated herein somewhat diagrammatically at 20, and has the impression roll 21 which is engraved with the design or pattern with proper corrections for subsequent deformation of the design or pattern to eventually produce the perfect, undistorted design. This roll 21 (or the opposite roll 22 with which it cooperates) is preferably very slightly recessed as indicated in an exaggerated manner at 23, to provide slightly greater clearance between the rolls 21 and 22 at the place indicated by dotted lines at 24 in Fig. 6 in the particular pattern where the hump 16 is to be formed so as to provide sufficiently increased thickness of rubber at this place to insure extra stock for the stretching thereof in the subsequent formation of the hump 16 whereby the rubber, when distended in the hump form, is of adequate thickness and of substantially the same thickness as that of the unstretched areas.

Preferably the roll 21 is of suitable size and has the design engraved thereon to form one complete mat blank in each revolution thereof so that the rubber sheet 25 comes from the rolls 21 and 22 with successive mat designs impressed thereon as indicated at 26 in Fig. 6. This sheet is removed from the rolls 21 and 22 by the conveyor 27, and while on the conveyor or after it leaves same, it is cut into separate blanks as indicated by dotted lines at 28 in Fig. 6, each of which has a complete design 26 thereon and sufficient margin therearound to insure ample size to make a mat.

Each blank is then, in accordance with our preferred practice, and as more fully explained in our aforesaid application Serial No. 696,136 and the Patent No. 2,032,832 granted thereon and in our co-pending applications Serial No. 39,723 and Serial No. 39,724, placed on a form 29, the top surface of which is a reproduction of the floor on which the mat is to be used and by subjecting to heat and vacuum or air pressure, if necessary, the soft rubber is caused to settle down onto and around the surfaces of the form so as to assume the shape thereof, during which operation the hump forming portions of the blank are stretched and distended into the hump form (during which operation the rubber pulls in to a varying extent along the edges depending on the shape, size and location of the hump) after which the rubber blank is set in the newly assumed form by vulcanization. The rubber is heated and softened in the calendering operation and is preferably placed on the form while still hot and soft from calendering in which case the rubber not only may be shaped without special heating, but shrinkage which is particularly pronounced in cooling is minimized or prevented, and therefore less distortion of the design on the impression roll to compensate for shrinkage of the product is accordingly required on this account.

As previously stated, the rubber pulls off from the impression roll 21 at some places less readily than at others, due particularly to the difference in the design at such places and this results in localized stretching and uneven looseness or bagging of the rubber. To cure this irregular, loose or baggy condition, the take-off conveyor 27 is run at a surface speed sufficiently greater than that of the rolls 21 and 22 to stretch the rubber and eliminate any loose or baggy areas so that the rubber is received on the conveyor 27 in a smooth, flat condition.

In preparing the design on the roll 21 correction must be made for the pulling in that occurs along the edges of the blank, as well as for the stretching in taking the rubber off of the impression roll and any shrinking that may occur thereafter, which however, is minimized or prevented by forming the blank in the contoured mat form while still hot from the calender. Some correction of the lines 19 at the sides of the hump may also be required to insure absence of objectionable distortion thereof in the flat portions of the mat adjacent the hump or correction on the hump portion itself may also be required to harmonize with the arrangement of the lines elsewhere on the mat although it is to be understood that the lateral stretching of the rubber at the hump necessarily produces a wider spacing of the lines 19 on the hump which would require the introduction of additional lines in the hump forming portion to insure exactly the same spacing here as in the flat portions of the mat. This, however, has not been found necessary in this particular design as it is only important to avoid objectionable distortion of the lines 19 in the flat areas and to have the lines arranged on the hump in a direction reasonably consistent with the shape of the hump and the lines 19 on the rest of the mat.

The above corrections may be accomplished by providing punch marks on the roll 21 at suitable places to indicate approximately the proposed location of the pattern and certain selected portions thereof that is to be engraved thereon, and especially the border lines 18 thereof, after which rubber is passed between the rolls 21 and 22 and formed in a sheet which is taken off by the conveyor 27 running at a sufficiently higher speed than the rolls 21 and 22 to give it enough stretch to compensate for any sticking that will occur thereafter with the engraved roll. While the rubber is still hot a portion thereof containing the impression of the pattern locating punch marks is then used to make the contoured mat in the manner above described by shaping on the form 29, and by comparing the location of the punch mark impressions on the mat shaped rubber with the desired pattern and arrangement of lines and other features of the design and relocating the punch marks on the impression roll as may seem necessary from such comparison and making and trying other sample sheets of rubber, the proper arrangement of the design to be engraved on the roll 21 with the necessary distortions are thus determined, and the sheets of rubber produced by the rolls 21 and 22 will have the design impressed thereon somewhat as indicated in Fig. 6 in such a manner that when shaped in the contoured form on the floor shaped form 29, the design will appear thereon in perfect, undistorted form as shown in Fig. 1.

Obviously when the blanks are prepared in this manner, the design or pattern is impressed thereon in the same operation that forms the rubber into sheet form and high speed production is accordingly assured as the blanks can be produced as fast as the calender rolls the rubber into the sheet form.

While we have shown and described our invention in a preferred form, we are aware that various changes and modifications may be made therein without departing from the principles of our invention, the scope of which is to be determined by the appended claims.

We claim as our invention:

1. The method of making from thermoplastic material a molded and contoured product with a predetermined surface design, which said method comprises applying on an experimental uncontoured blank of the thermoplastic material trial markings corresponding in relative location to certain features of said predetermined surface design, then contouring the blank by heating it and subjecting it to pressure so as to stretch and give to the experimental blank a contour corresponding to that which is to be imparted to the final product, then preparing a design impressing member with a negative of said design thereon distorted in a manner determined by the displacement of the trial markings in contouring the experimental blank, then with said design impressing member molding a final product blank of the thermoplastic material and thereby imparting to one side thereof the distorted design of said member, and thereafter contouring said latter blank by heating it and subjecting it to pressure to stretch and give thereto a permanent contour with a portion thereof shaped to a different contour than it received in the operation of molding with the design impression member and by such permanent contouring thereof correcting the distortion of the design imparted thereto by said member.

2. The method of making from thermoplastic material molded and contoured floor coverings or like products with a predetermined surface design, which said method comprises molding the product and thereby imparting to one side thereof said design in a predeterminately distorted form, then contouring the product by heating it and subjecting it to pressure so as to stretch and give a permanent contour to the product with a portion thereof shaped to a different contour than it received in the first molding operation and by such stretching correcting the distortion of the design imparted to it in the first molding operation.

3. The method of making from thermoplastic material molded and contoured floor coverings or like products with a predetermined surface design, which said method comprises molding the product and thereby imparting to one side thereof said design in a predeterminately distorted form, then contouring the product by heating it and subjecting it to fluid pressure so as to stretch and give a permanent contour to the product with a portion thereof shaped to a different contour than it received in the first molding operation and by such stretching correcting the distortion of the design imparted to it in the first molding operation.

4. The method of making from thermoplastic material molded and contoured floor coverings or like products with a predetermined surface design, which said method comprises molding a sheet of thermoplastic material and thereby imparting to one side thereof a predeterminately distorted impression of such design, then applying the sheet to a floor shaped form and heating it and subjecting it to pressure to locally stretch and distend the product to fit elevated portions of the form and give to the product a permanent contour with a portion thereof shaped to a different contour than it received in the first molding operation, and thereby to correct the distortion of said design impression imparted to the product in the first molding operation.

5. The method of making from thermoplastic material molded and contoured floor coverings or like products with a predetermined surface design, which said method comprises calendering on one side of a sheet of the thermoplastic material a predeterminately distorted impression of such design, then contouring the product by heating and subjecting it to pressure so as to stretch and give a permanent contour to the product with a portion thereof shaped to a different contour than it received in the calendering operation, and thereby to correct the distortion of said impression imparted to the product in the calendering operation, and setting the product in the resultant contoured form.

6. The method of making from thermoplastic material molded and contoured floor coverings or like products with a predetermined surface design, which said method comprises calendering a sheet of the thermoplastic material and thereby heating the product and imparting to one side thereof a predeterminately distorted impression of such design, then while hot from the calendering subjecting it to pressure so as to stretch and give a permanent contour to the product with a portion thereof shaped to a different contour than it received in the calendering operation, and thereby to correct the distortion of said impression imparted to the product in the calendering operation, and setting the product in the resultant contoured form.

7. The herein described method of making a contoured sheet product having a predetermined surface design thereon, comprising the steps of impressing on a thermoplastic blank a surface design having a predetermined distortion with respect to the final desired design, and then contouring the blank to a different physical contour and by such contouring reforming the distorted design to the final and desired undistorted condition thereof.

8. The herein described method of making a contoured sheet product having a predetermined surface design thereon, comprising the steps of impressing on a thermoplastic blank a surface design having a predetermined under-distortion with respect to the final desired design, and then contouring the blank by stretching to a different physical contour and by such contouring stretching the under-distorted design to the final and desired undistorted condition thereof.

9. The herein described method of making a contoured sheet product having a predetermined surface design thereon, comprising the steps of calendering thermoplastic material into sheet form and simultaneously impressing by the calendering operation a surface design on the sheet in a predetermined distorted condition with respect to the final desired design, contouring the sheet while in a heated condition as the result of the calendering and by such contouring reforming the distorted design to the final and desired undistorted condition thereof.

10. The herein described method of making a contoured sheet product having a predetermined surface design thereon, comprising the steps of calendering thermoplastic material into sheet form and simultaneously impressing by the calendering operation a surface design on the sheet in a predetermined underdistorted condition with respect to the final desired design, and then contouring the sheet while in a heated condition as the result of the calendering and by stretching to a different physical contour and by such contouring stretching the underdistorted design to the final and desired undistorted condition thereof.

11. The herein described method of making a hollow-humped sheet product having a predetermined surface design thereon, comprising the steps of calendering thermo-plastic material into sheet form and by said calendering operation providing a thickened area in the sheet and a distorted impressed surface design on the sheet and extending across the thickened area thereof, preventing shrinking of the calendered sheet, and stretching the thickened area of the sheet into a hollow hump and by such stretching reforming the distorted surface design to the finished desired undistorted condition thereof.

12. The herein described method of making a hollow-humped sheet product having a predetermined surface design thereon, comprising the steps of calendering thermo-plastic material into sheet form and by said calendering operation providing a thickened area in the sheet and a distorted impressed surface design on the sheet and extending across the thickened area, feeding the sheet away from the calendering operation at a speed such as will slightly stretch the sheet, and stretching the thickened area of the sheet into a hollow-hump and by such stretching reforming the distorted surface design to the finished desired undistorted condition thereof.

13. The herein described method of making a hollow-humped sheet product having a predetermined surface design thereon, comprising the steps of impressing in a thermo-plastic blank a thickened area and a distorted surface design extending across the thickened area, and stretching the thickened area into a hollow hump and by such stretching reforming the distorted surface design to the finished desired undistorted condition thereof.

GEORGE W. BLAIR.
JOHN F. SCHOTT.